(12) United States Patent
Wollesen et al.

(10) Patent No.: US 9,344,128 B2
(45) Date of Patent: May 17, 2016

(54) SYSTEM AND METHOD FOR DECODING A RADIO SIGNAL

(71) Applicant: Per Vices Corporation, Toronto (CA)

(72) Inventors: Victor Wollesen, Toronto (CA); Yi Yao, Toronto (CA)

(73) Assignee: Per Vices Corporation, Toronto (CA)

(*) Notice: Subject to any disclaimer, the term of this patent is extended or adjusted under 35 U.S.C. 154(b) by 0 days.

(21) Appl. No.: 14/072,438

(22) Filed: Nov. 5, 2013

(65) Prior Publication Data

US 2014/0079158 A1    Mar. 20, 2014

Related U.S. Application Data

(63) Continuation of application No. PCT/CA2012/000314, filed on Mar. 26, 2012.

(60) Provisional application No. 61/483,289, filed on May 6, 2011.

(51) Int. Cl.
*H04L 27/06* (2006.01)
*H04B 1/16* (2006.01)
*H04B 1/00* (2006.01)

(52) U.S. Cl.
CPC .............. *H04B 1/16* (2013.01); *H04B 1/0007* (2013.01)

(58) Field of Classification Search
CPC ... G06F 21/577; G06F 21/84; H04L 27/0006; H04W 64/00
USPC ......................................... 375/316, 340, 343

See application file for complete search history.

(56) References Cited

U.S. PATENT DOCUMENTS

| | | | |
|---|---|---|---|
| 4,501,020 A | 2/1985 | Wakeman | |
| 4,818,949 A | 4/1989 | Cohen | |
| 5,812,609 A | 9/1998 | McLochlin | |
| 7,236,500 B1 | 6/2007 | Greenberg | |
| 2007/0092045 A1 | 4/2007 | Woo et al. | |
| 2007/0174891 A1 | 7/2007 | Gouhara | |
| 2008/0118011 A1 | 5/2008 | Trachewsky et al. | |
| 2009/0323784 A1 | 12/2009 | Depienne et al. | |
| 2010/0054352 A1* | 3/2010 | Huttunen et al. | 375/260 |
| 2010/0157066 A1 | 6/2010 | Challapali et al. | |
| 2011/0288823 A1* | 11/2011 | Gupta | 702/189 |
| 2013/0331992 A1* | 12/2013 | Subramaniam et al. | 700/266 |

OTHER PUBLICATIONS

Qui, R.C. et al.; "Towards a Real-time Cognitive Radio Network Tested: Architecture, Hardware Platform, and Application to Smart Grid"; Fifth IEEE Workshop on Networking Technologies for Software Defined Radio (SDR) Networks; 2010; pp. 1 to 6.

(Continued)

*Primary Examiner* — David S Huang
(74) *Attorney, Agent, or Firm* — Thomas Wong; Blake, Cassels & Graydon LLP (57) ABSTRACT

A method of decoding a radio signal by an electronic device is provided. The method includes receiving the radio signal, digitizing the radio signal, auto-correlating the radio signal to generate a first signal and determining periodic information of the radio signal using the first signal. An electronic device, such as a software defined radio, is also provided. The electronic device includes a radio frequency front end, a processing unit and memory. The processing unit may also include a field programmable gate array and a graphics processing unit.

22 Claims, 10 Drawing Sheets

(56) References Cited

OTHER PUBLICATIONS

Kim, K. et al.; Specific Emitter Identification for Cognitive Radio with Application to IEEE 802.11; IEEE Telecommunications Conference; 2008; pp. 1 to 5.

Van Eck. W.; "Electromagnetic Radiation from Video Display Units: An Eavesdropping Risk?"; Computers & Security 4; 1985; pp. 269 to 286.

Kuhn, M.; "Compromising emanations: eavesdropping risks of computer displays"; Technical Report No. 577; University of Cambridge Computer Laboratory; Dec. 2003; http://www.cl.cam.ac.uk/TechReports/; ISSN: 1476-2986.

Kuhn, M; "Electromagnetic Eavesdropping Risks of Flat-Panel Displays"; $4^{th}$ Workshop on Privacy Enhancing Technologies; May 2004.

Che, S. et al.; "Accelerating Compute-Intensive Applications with GPUs and FPGAs"; IEEE Symposium on Application Specific Processors (SASP); Jun. 2008.

Pawelczak, P.; "Technical Challenges of Cognitive Radio-Related systems"; First Annual Conference on Competition and Regulation in Network Industries; 2008.

Product Information Sheet for USRP N200 Series Ethernet Software Radio Systems; published at least as early as Mar. 23, 2011; Ettus Research.

Huie, J. et al.; "Synthesizing FPGA Cores for Software-Defined Radio"; 2005; Altera Corporation.

Cycline II FFT Co-Processor Reference Design, Application Note 375; Version 1.0; May 2005; Altera Corporation.

Tsoi, K. et al.; "Axel: A Heterogeneous Cluster with FPGAs and GPUs"; FPGA'10, Feb. 2010.

Kim, J. et al.: "Implementation of an SDR system Using Graphics Processing Unit"; IEEE Communications Magazine; Mar. 2010.

Denic, S.; Search Report from corresponding PCT Application No. PCT/CA2012/000314; search completed Aug. 15, 2012.

"An Introduction to Correlation"; IEEE Acoustics, Speech, and Signal Processing Newsletter; Aug. 1, 1974; pp. 3 to 7; vol. 30, No. 1; IEEE; U.S.A.

Galli, P.; Supplementary Partial Search Report from corresponding European Application No. 12782130.4; search completed Jan. 28, 2015.

\* cited by examiner

SYSTEM AND METHOD FOR DECODING A RADIO SIGNAL

CROSS-REFERENCE TO RELATED APPLICATIONS

This application is a continuation of International PCT Application No. PCT/CA2012/000314 filed on Mar. 26, 2012, which claims priority from U.S. Provisional Patent Application Ser. No. 61/483,289 filed on May 6, 2011, the entire contents of both of which are incorporated herein by reference.

TECHNICAL FIELD

The present invention relates to radio communication systems, and in particular to software defined radio systems.

BACKGROUND OF INVENTION

Traditionally, development of radio communication products involves significant hardware development effort. Software defined radio (SDR) is a technology that implements physical layer wireless communication technologies in software, turning many radio-related hardware development problems into software issues. This can shorten the product development cycle, reduce costs, and make product distribution much easier. Moreover, SDR provides increased flexibility and programmability, which can speed up innovation in wireless communications.

SDR platforms have been developed using a personal computer's central processing unit (CPU), working in connection with a field programmable gate array (FPGA), with some radio frequency (RF) front end hardware to receive and transmit radio waveforms. Some SDR applications require complex modulation or computationally intensive algorithms that may include Fast Fourier Transforms (FFTs), cross-correlation, or the calculation of mutual information metrics. These operations can be costly in terms of processing power. A CPU working in connection with an FPGA may lack the computing architecture to support these applications. More recently, SDR platforms have been developed using a CPU working in connection with a graphics processing unit (GPU). However, a GPU working in connection with a CPU may lack the streaming or serial processing capabilities to fulfill the real-time requirements of digital communication algorithms that perform serial processing.

It is an object of the present invention to obviate or mitigate at least one of the above disadvantages.

SUMMARY OF THE INVENTION

In one aspect, a method of decoding a radio signal by an electronic device is provided. The method includes receiving the radio signal, digitizing the radio signal, auto-correlating the radio signal to generate a first signal and determining periodic information of the radio signal using the first signal.

In another aspect, an electronic device, such as an SDR device, is provided. The electronic device includes a RF front end, a processing unit and memory, the memory storing computer executable instructions that when executed by the processing unit, causes the electronic device to receive the radio signal, digitize the radio signal, auto-correlate the radio signal to generate a first signal and determine periodic information of the radio signal using the first signal.

The processing unit may include an FPGA in communication with the RF front end. The FPGA can perform serial processing on the digitized radio signal provided by the RF front end. The processing unit may also include a GPU in communication with the FPGA for performing parallel processing on the digitized radio signal provided by the FPGA.

In another aspect, a computer readable storage medium for decoding a radio signal by an electronic device is provided. The computer readable storage medium includes computer executable instructions that when executed by a processing unit, causes the electronic device to receive the radio signal, digitize the radio signal, auto-correlate the radio signal to generate a first signal and determine periodic information of the radio signal using the first signal.

In another aspect, an electronic device is provided. The electronic device includes a radio frequency front end for receiving electromagnetic radiation and digitizing the electromagnetic radiation to generate a digital signal. The electronic device also includes a field programmable gate array in communication with the radio frequency front end. The field programmable gate array is optimized for performing serial processing. The electronic device also includes a graphics processing unit in communication with the field programmable gate array optimized for performing parallel processing.

BRIEF DESCRIPTION OF THE DRAWINGS

Embodiments of the invention will be described by way of example only with reference to the accompanying drawings in which.

DETAILED DESCRIPTION OF THE INVENTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details.

In other instances, well-known methods, procedures and components have not been described in detail so as not to obscure the example embodiments described herein. Also, the description is not to be considered as limiting the scope of the example embodiments described herein.

Figure 1:
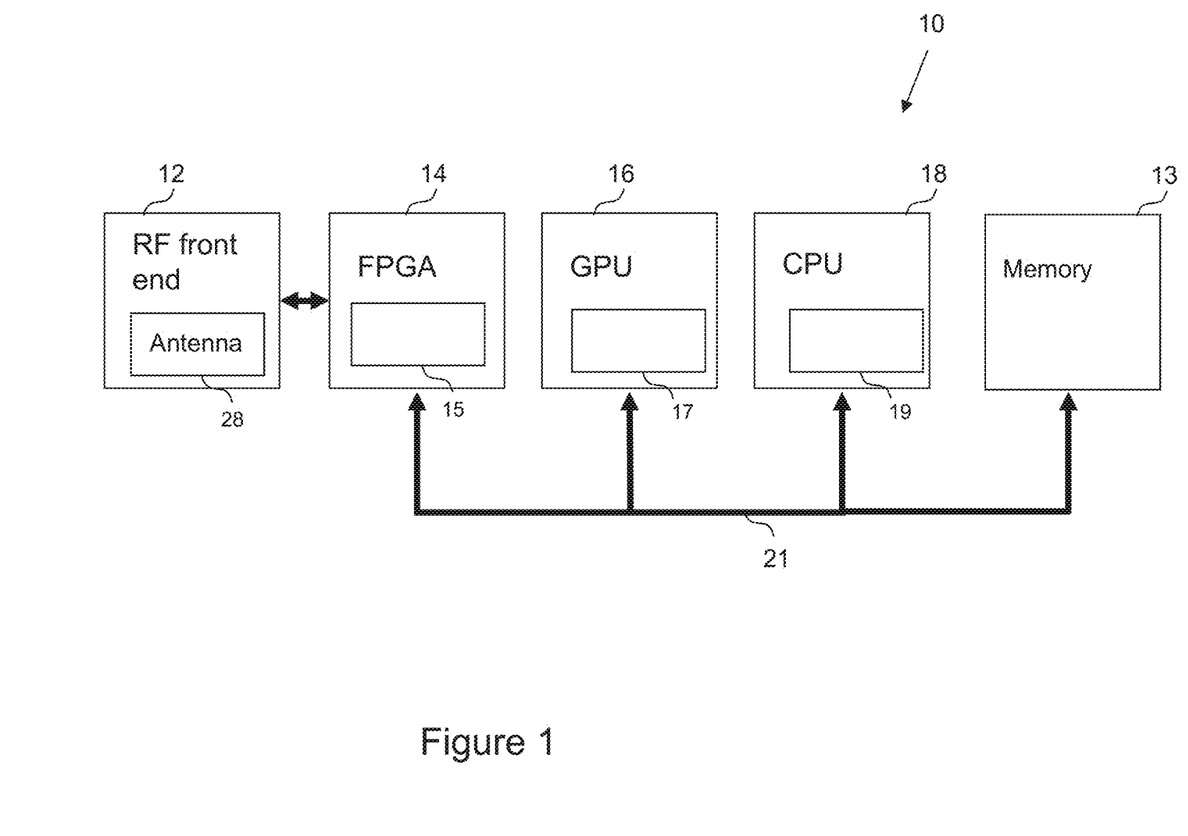
FIG. 1 is a block diagram of an example SDR device.

Turning to FIG. 1, a schematic diagram of an example SDR device 10 is provided. In this example, the SDR device 10 includes a RF front end 12 having an antenna 28 for receiving and converting electromagnetic radiation into a digital signal, a field programmable gate array (FPGA) 14 for performing high speed serial processing and a graphics processing unit (GPU) 16 for performing parallel processing. The SDR device 10 may also include a general purpose computer processing unit (CPU) 18 for performing general computations including providing the user interface and programming the FPGA 14 and GPU 16. The FPGA 14, GPU 16 and CPU 18 can each have its own memory 15, 17 and 19, respectively and/or can access a separate memory component 13 of the device 10. It is understood that the FPGA 14 can include any suitable programmable logic device and GPU 16 includes general purpose computing on graphics processing unit ((GP) GPU).

In the example of FIG. 1, the RF front end 12 is connected to the FPGA 14 and is operable to communicate with the FPGA 14 by a plurality of digital signals. The FPGA 14, GPU 16 and CPU 18 are connected to one another by a high speed bus 21, such as a Peripheral Component Interconnect Express (PCIe) bus, for example.

The SDR device 10 enables rapid serial and parallel computation of signal processing data. For example, the SDR device 10 can divide signal processing algorithms into block and streaming processes and implement the block and stream processes to optimize processing efficiency. Stream processing may segment the input signal into a plurality of discrete segments or "chunks" based, in part, on the current state of the input signal passing through it, while block processing may comprise fixed, invariant, processing on each chunk.

In one example SDR device 10, the FPGA 14 is optimized to provide a serial processing environment to perform stream processing faster than the GPU 16. The GPU 16 is optimized to provide a parallel processing environment to parallelize block processes faster than the FPGA 14. The GPU 16, thus effectively implements parallelizable calculations and algorithms, including, for example, weak signal reconstruction, auto-correlation, FFTs, mutual information metrics, as well as concurrent processing of arbitrary algorithms or calculations on single or multiple data streams.

The programmability of the FPGA 14 and the GPU 16 also provides flexibility, such that the SDR device 10 may be capable of running arbitrary wireless protocols. For example, FPGA 14 and GPU 16 can be reprogrammed by CPU 18 during operation to handle changes in the communication protocol of the input signal. Once programmed, the SDR device 10 can autonomously store and send data without requiring additional configuration or intervention.

The SDR device 10 can also be configured to concurrently monitor spectral and network resources and adjust transmission and receiving parameters accordingly. Furthermore, the SDR device 10 can manage its own resources (e.g., FPGA 14 and GPU 16) such that tasks are efficiently allocated to the appropriate component based on the type of computation and resource usage.

In an example application of the SDR device 10, it is operable to identify and intercept electromagnetic radiation emanating from an electronic device and to decode the electromagnetic radiation. For example, computer monitors, keyboards, cellular phones, pagers and RFID readers and tags can emit various forms of electromagnetic radiation such as radio waves when in operation. The electromagnetic radiation of an electronic device may be related to the input signal processed by that device. When electromagnetic radiation is emitted from an electronic device in the form of radio waves, the SDR device 10 is operable to intercept these radio waves a distance away from the electronic device, including through physical barriers such as walls and doors.

In the example of a computer monitor, the SDR device 10 can receive and decode electromagnetic emanations of the computer monitor, which are related to its input signal, to determine the image displayed on the computer monitor. By decoding the emanation signal, the SDR device 10 can surreptitiously reproduce, or enable reproduction of the images displayed on the computer monitor remotely, without the knowledge of the computer monitor or its user.

Figure 2:
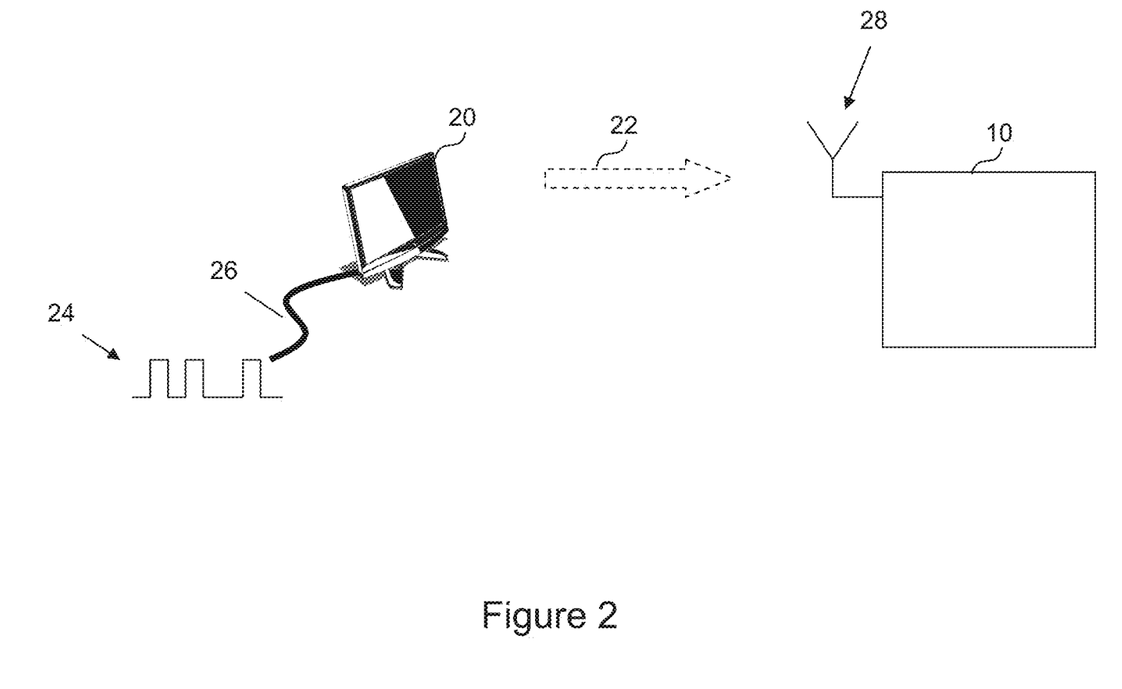
FIG. 2 is a block diagram of a target monitor receiving an input signal and producing an emanation signal that is intercepted by an example SDR device.

Turning to FIG. 2, a block diagram of a target monitor 20 receiving an input signal 24, for example from the target monitor's video interface cable 26 (such as DVI, VGA or HDMI, for example), is provided. Based on the input signal 24, the target monitor 20 displays an image which also causes the target monitor 20 to produce an emanation signal 22, in the form of electromagnetic radiation, and specifically radio waves. The emanation signal 22 can be received or intercepted by an antenna 28 of the SDR device 10.

Figure 3:
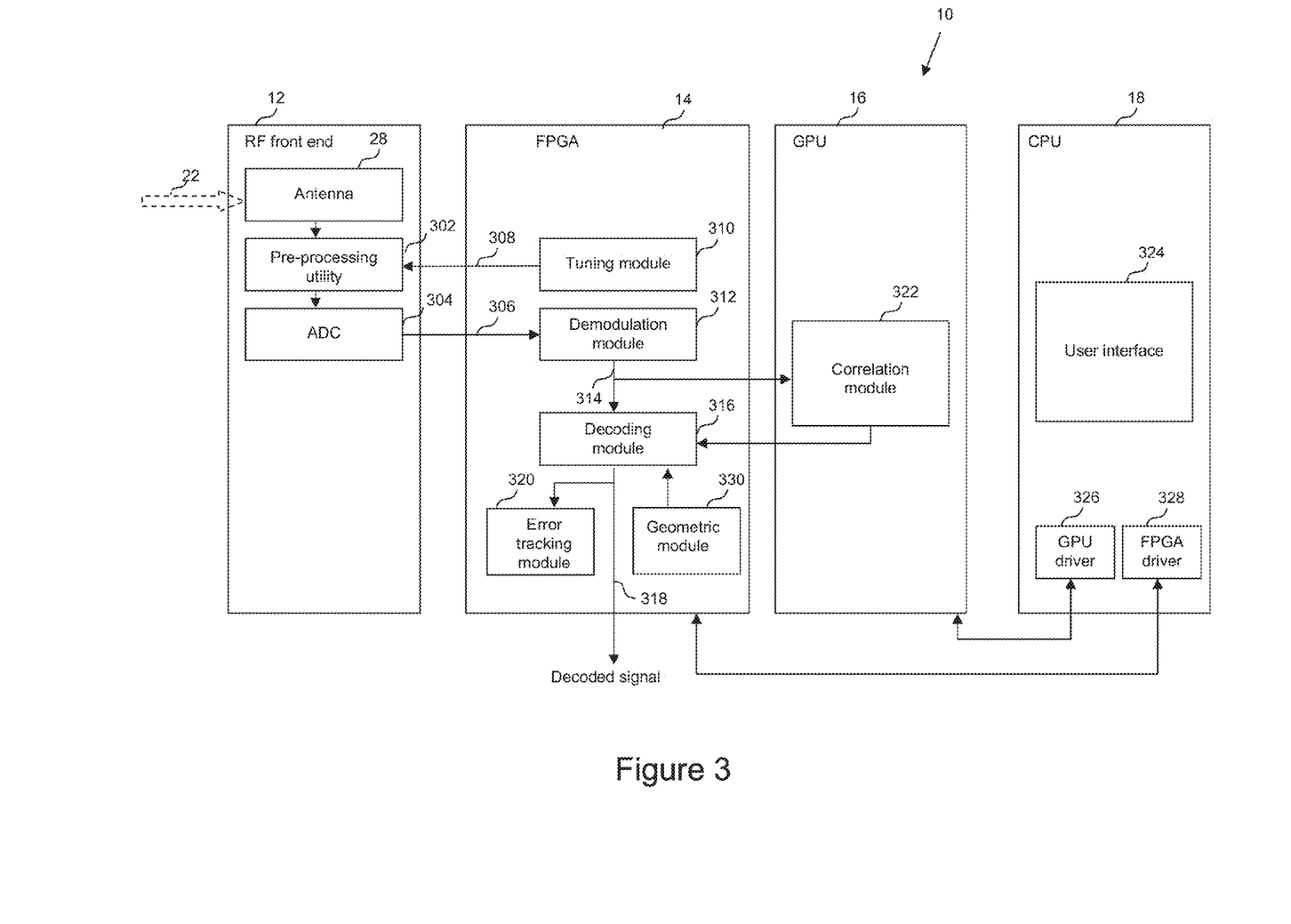
FIG. 3 is a block diagram of an example configuration of the SDR device for the specific application of decoding an emanation signal.

Turning to FIG. 3, a block diagram of an example configuration of the SDR device 10 for the specific application of decoding an emanation signal 22 is provided. The SDR device 10 has an RF front end 12 which includes an antenna 28 to receive an emanation signal 22, a pre-processing utility 302 to process the emanation signal 22 for digitization, and an analog to digital converter (ADC) 304 to convert the received emanation signal 22 into a digital signal 306: A tuning module 310 of the FPGA 14 may provide a tuning frequency 308 to the pre-processing utility 302 to tune the pre-processing utility 302 to a particular frequency corresponding to the emanation signal 22. The digital signal 306 produced by the ADC 304 is sent to the FPGA 14.

Figure 4:
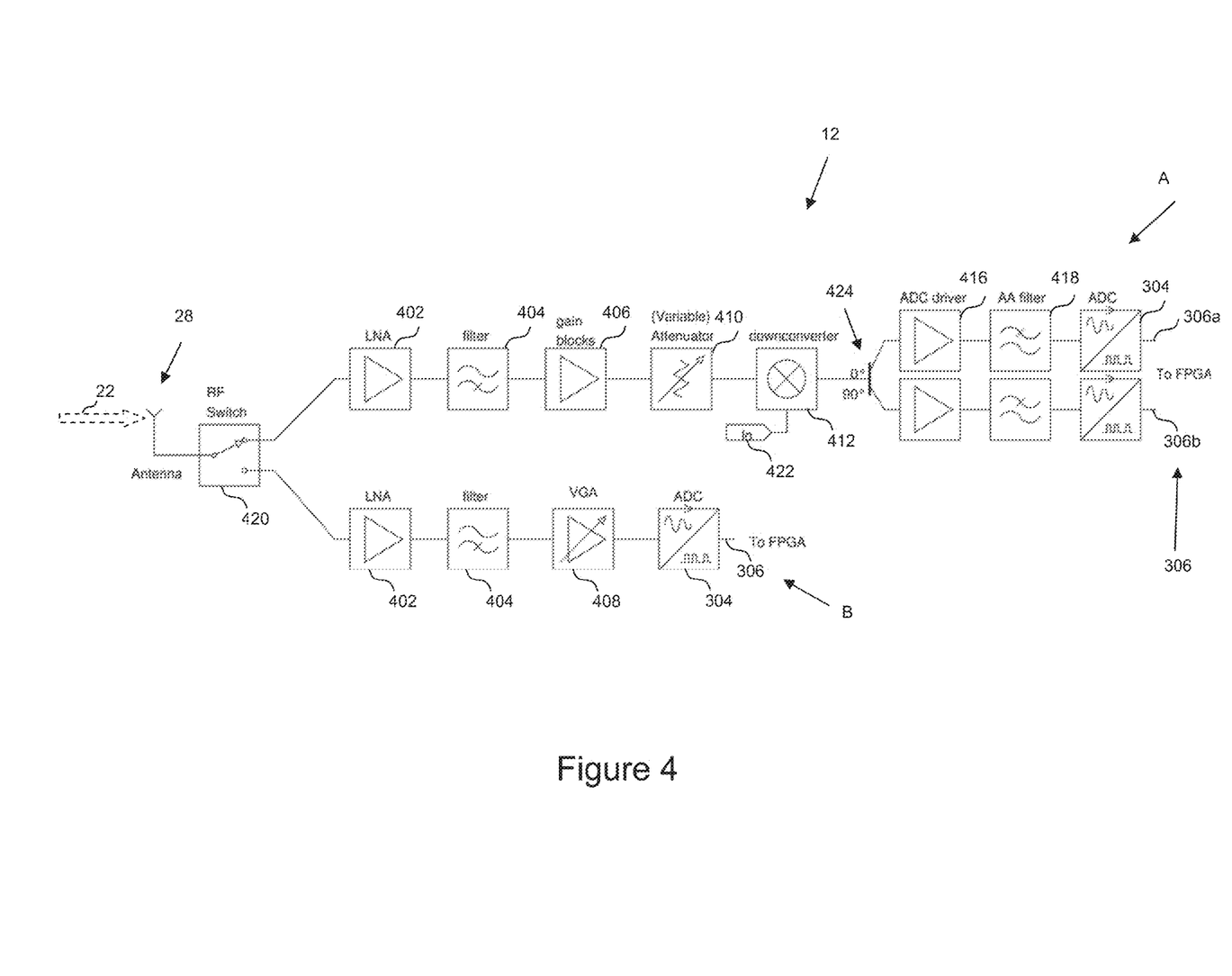
FIG. 4 is a schematic diagram of an example radio frequency front end.

Turning to FIG. 4, a more detailed schematic diagram of an example RF front end 12 is provided. The RF front end pre-processes the emanation signal 22 by amplification and down-conversion prior to digitization. The RF front end includes an antenna 28 to intercept the emanation signal 22 and may include pre-processing components such as a low noise amplifier (LNA) 402 to amplify weak signals, a high pass filter (HPF) 404 to filter and pass high frequencies and attenuate low frequencies, an amplifier (e.g. gain block 406 and/or variable gain amplifier 408), a variable attenuator 410 to vary the signal gain, a down-converter 412 to down-convert the signal to baseband, an analog to digital converter (ADC) 304, and a driver 416 and anti-aliasing filter 418 to improve the quality of the ADC conversion.

In the example of FIG. 4, the RF front end 12 has two modes of operation, A and B, selectable by a switch 420. Each mode of operation performs a series of operations on the emanation signal 22 before digitization by the ADC 304. In FIG. 4, the first mode of operation A is selected. The emanation signal 22 intercepted by the antenna 28 is amplified by the LNA 402 and filtered using the HPF 404. The gain of the analog signal is then modified using gain block 406 and variable attenuator 410. The resulting signal is then down-converted by mixing in a signal generated by the local oscillator 422 using mixer 412 to produce a baseband signal. The local oscillator 422 is configured to generate a signal at the tuning frequency 308 provided by the tuning module 310 of the FPGA 14. The baseband signal can be phase shifted by phase converter 424, further amplified by driver 416 and filtered by anti-aliasing filter 418 prior to digitization using the ADC 304. In this example, the resulting digital signal 306 is decomposed into its quadrature-carrier (IQ) form comprising an in-phase component 306a, and a quadrature component 306b. The cut off frequency of the baseband signal can be determined by the anti-aliasing filters 418 and can be configured based on the application of the SDR device 10.

By modifying the tuning frequency 308, the SDR device 10 can tune into and isolate an individual emanation signal 22 from one or more emanation signals received by the antenna 28. For example, the SDR device 10 can isolate an emanation signal 22 from a particular monitor from a group of monitors in close spatial proximity, as the emanation signals associated with each monitor will have a different carrier frequency.

In the second mode of operation B, the analog signal received by the antenna 28 can be amplified by LNA 402 and filtered using HPF 404, as in first mode of operation A. However, the analog signal can then be amplified using variable gain amplifier 408 and directly applied to ADC 304.

It can be appreciated that the RF front end 12 can be any appropriate receiver capable of digitizing the emanation signal 22 with a sufficient signal-to-noise ratio to allow for reconstruction of the input signal 24 of the target monitor 20 by the SDR device 10. For example, RF front end 12 can be a superheterodyne receiver.

Turning back to FIG. 3, the SDR device 10 in this example also has an FPGA 14 configured to include a tuning module 310 for providing the pre-processing utility 302 of the RF front end 12 with a tuning frequency 308, a demodulation module 312 for demodulating the digital signal 306 to produce a demodulated signal 314, and a decoding module 316 for decoding the demodulated signal 314 to produce a decoded signal 318. The FPGA 14 can also include an error tracking module 320 to evaluate the error in the decoded signal 318 and to initiate error correction.

It can be appreciated that the FPGA 14 can have one or more demodulation modules 312 to carry out demodulation of the emanation signal 22, such as amplitude modulation (AM), frequency modulation (FM) and single-sideband modulation (SSB). Each demodulation module 312 can also apply demodulation to one or more different communication protocols (for example Global System for Mobile Communications (GSM) or Zigbee). The modulation techniques and communication protocols can be configured by the user or provided by third parties. Furthermore, a demodulation module 312 can be reprogrammed during operation to implement a different modulation technique and/or communication protocol. Accordingly, the demodulation module 312 allows for different modulation techniques and communication protocols to be chosen and implemented on the fly while the device remains operational.

It can further be appreciated that the FPGA 14 can route the digital signal 306 to one or more of its modules, its internal memory, and/or bypass the FPGA processing altogether, by configuring the programmable switches provided by the FPGA. For example, certain data may not require the use of both the FPGA 14 and GPU 16. Certain communications protocols may be defined and processed entirely within the FPGA 14 and not require the parallel processing environment provided by the GPU 16. The selection and passage of the signal within the FPGA 14 can be set according to the desired application using appropriately configured switches.

The SDR device 10 in the example also has a GPU 16 configured to include a correlation module 322 for evaluating the similarities in the demodulated signal 314 relative to a separation of time (i.e. finding repeating patterns in the demodulated signal 314) and for providing parameters characterizing that similarity to the decoding module 316 of the FPGA 14. For example, the correlation module 322 is operable to perform cross-correlation and/or auto-correlation.

Figure 5:
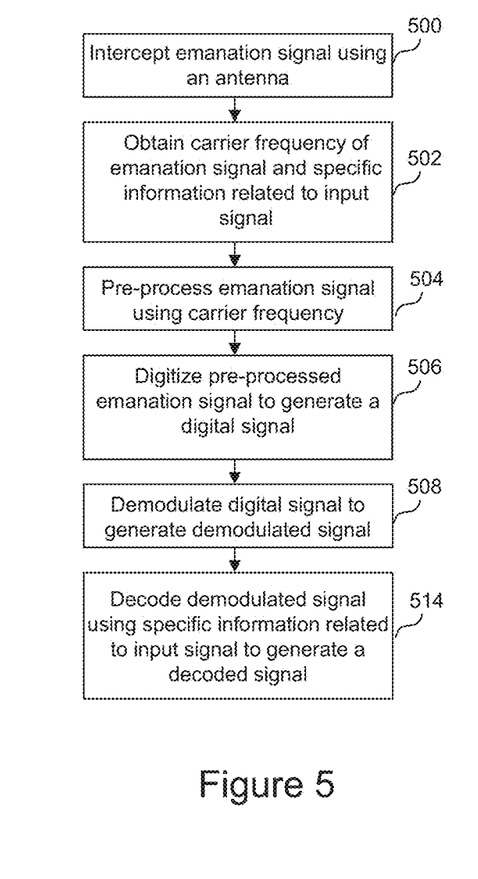
FIG. 5 is a flow chart of an example process for decoding the input signal of a target monitor from its electromagnetic radiation using an example SDR device.

Turning to FIG. 5, a flow chart of an example process for decoding the input signal 24 of a target monitor 20 from its emanation signal 22 using the SDR device 10 is provided. At block 500, RF front end 12 intercepts an emanation signal 22 using its antenna 28. At block 502, the device 10 obtains the carrier frequency $f_c$ of the emanation signal 22 and specific information related to the input signal 24, such as periodic and geometric information. At block 504, RF front end 12 tunes into the carrier frequency by pre-processing the emanation signal 22 at the carrier frequency $f_c$. At block 506, RF front end 12 digitizes the pre-processed emanation signal using its ADC 304 to generate a digital signal 306. At block 508, FPGA 14 demodulates the digital signal 306 using its demodulation module 312 to generate a demodulated signal 314. At block 512, FPGA 14 decodes the demodulated signal 314 using specific information related to the input signal 24 to generate a decoded signal 318. The decoded signal 318 contains all the information of the input signal 24 sufficient to generate an image on another monitor corresponding to the same image of the input signal 24 on the target monitor 20.

Figure 6A:
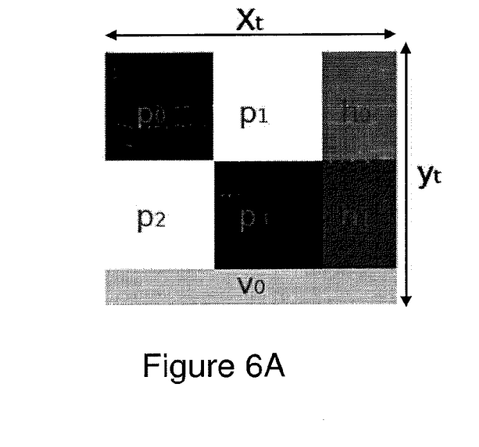
FIG. 6A is a front view of a target monitor displaying an example 2 by 2 pixel image.
Figure 6B:
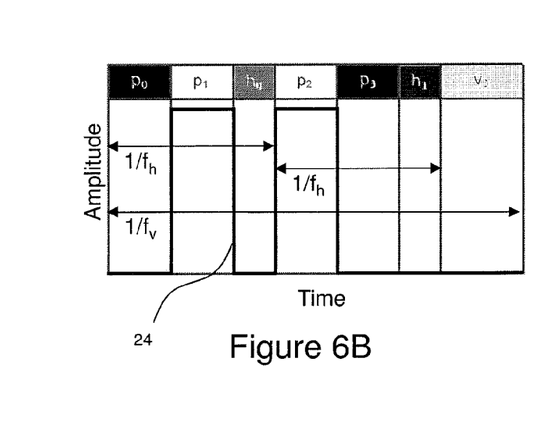
FIG. 6B is an example input signal corresponding to the pixel image of FIG. 6A.
Figure 6C:
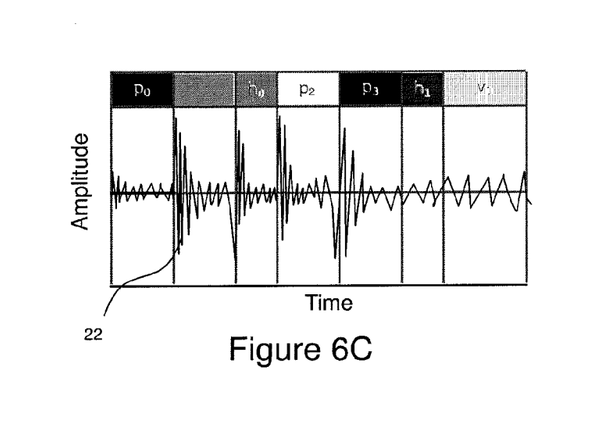
FIG. 6C is an example emanation signal corresponding to the input signal of FIG. 6B.

FIG. 6A provides an example 2 by 2 pixel image of a theoretical target monitor 20, and FIGS. 6B and 6C provide waveforms of the signals corresponding to the pixel image of FIG. 6A. For simplification of understanding, the example of FIG. 6A considers a target monitor 20 displaying a 2 by 2 pixel image and having a pixel field of $x_t$ by $y_t$. The pixels p0 to p3 make up the image, h0 and h1 represent horizontal retrace pauses, and v0 represents a vertical retrace pause. The horizontal retrace pauses h0, h1 transmit synchronization information to align the segment of the input signal 24 representing a horizontal line of a frame (i.e. p0 to p1) to the corresponding horizontal line of the target monitor 20. The vertical retrace pause v0 transmits synchronization information to align the segment of the input signal 24 representing a frame (i.e. the image of p0 to p3) to span the entire display of the target monitor 20, starting with p0 at the top left corner, and ending with p3 at the bottom right corner of the target monitor 20 (the retrace pauses are not actually displayed on the target monitor 20). An example input signal 24 corresponding to the pixel image of FIG. 6A is shown in FIG. 6B. The parameters $1/f_h$ and $1/f_v$ represent the time necessary for the input signal 24 to represent a horizontal line of the image, and the entire image, respectively. The parameters $f_v$ and $f_h$ are referred to as the vertical refresh rate and horizontal refresh rate of the target monitor 20, respectively. FIG. 6C provides an example emanation signal 22 corresponding to the input signal 24 of FIG. 6B. The example emanation signal 22 of FIG. 6C is an amplitude modulated signal of the input signal 24 at a carrier frequency $f_c$. In order to decode the emanation signal 22 by the SDR device 10, the carrier frequency $f_c$, periodic information of the input signal 24 (e.g. $f_h$ or $f_v$) and geometric information of the pixel field (e.g. $x_t$ and $y_t$) may need to be determined.

As noted above, at block 502, the SDR device 10 obtains the carrier frequency $f_c$ of the emanation signal 22 and specific information related to the input signal 24. In one embodiment, this information is obtained during the example initialization process of the SDR device 10 shown in FIG. 7. At block 702, RF front end 12 obtains a tuning frequency from the tuning module 310 of FPGA 14. At block 704, RF front end 12 pre-processes the emanation signal 22 at the tuning frequency using the pre-processing utility 302. At block 706, RF front end 12 digitizes the pre-processed emanation signal using its ADC 304 to generate a digital signal 306 and sends the demodulated signal to the demodulation module 312 of the FPGA.

Figure 7:
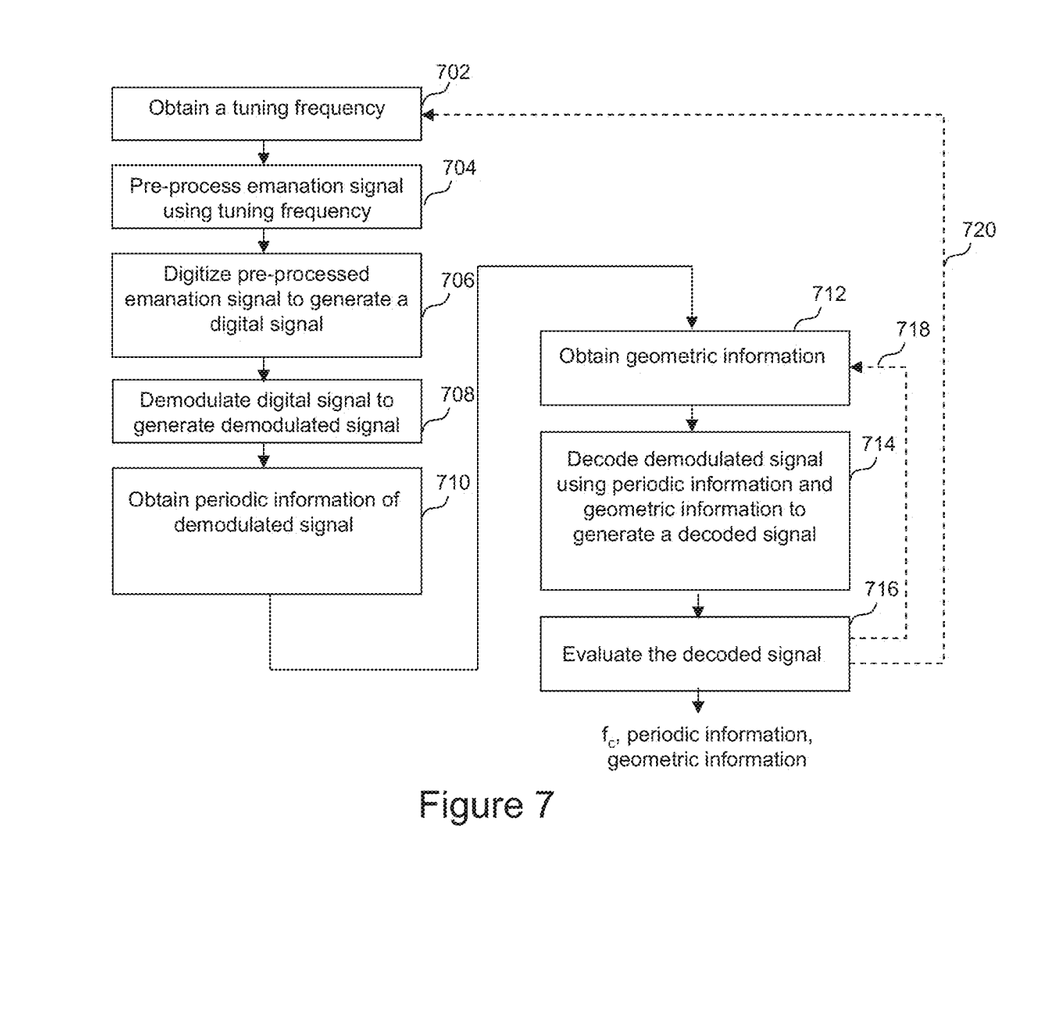
FIG. 7 is a flow chart of an example initialization process for an example SDR device.

At block 708, FPGA 14 demodulates the digital signal 306 using its demodulation module 312 to generate a demodulated signal 314. The demodulated signal 314 is then sent to the correlation module 322 of GPU 16.

At block 710, GPU 16 obtains periodic information of the demodulated signal 314 using the correlation module 322. In an embodiment, periodic information of the demodulated signal 314 can be obtained by cross-correlating the demodulated signal 314 with itself (i.e. auto-correlation). For example, a demodulated signal x[n] can be auto-correlated by computing an auto-correlation function $$\phi_{xx}[j] = \sum_m x[m+j]x[m]$$

to generate an auto-correlated signal, where m spans all the samples of x[n] and j represents the lag between the instances of x[n] being correlated.

Figure 8A:
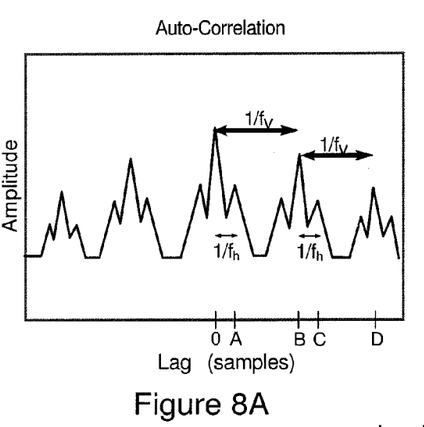
FIGS. 8A to 8C are example waveforms of an auto-correlated signal and the Fourier Transform thereof.

Referring to FIG. 8A, an example waveform of an auto-correlated signal is provided. The peaks of the auto-correlated signal may correspond to periodic information in the demodulated signal 314. The amplitude is greatest at a lag of 0 when the demodulated signal 314 is correlated with itself. There can also be significant correlation when the lag is not 0 since nearby frames in the demodulated signal 314 will be very similar. For example, the next highest peak not at lag 0, such as at lag B, can identify the periodicity of the demodulated signal 314 corresponding to $1/f_v$ (i.e. the length of a frame) since adjacent frames in the demodulated signal 314 will likely be very similar. Furthermore, there may be additional peaks spaced apart by approximately one frame length since nearby frames in the demodulated signal 314 will likely also be similar. The auto-correlated signal may contain secondary peaks, such as at lag A or C, corresponding to the length of a horizontal line within a frame, since adjacent or nearby horizontal lines may be similar. Although the lag has been described in the unit of samples in FIG. 8A, it will be appreciated that the unit of samples can be converted to time given the sampling frequency of the SDR device 10. The periodic information (e.g. $1/f_v$, $1/f_h$, $f_v$ and/or $f_h$) can be determined from the auto-correlated signal and sent to the decoding module 316 of FPGA 14.

Figure 8B:
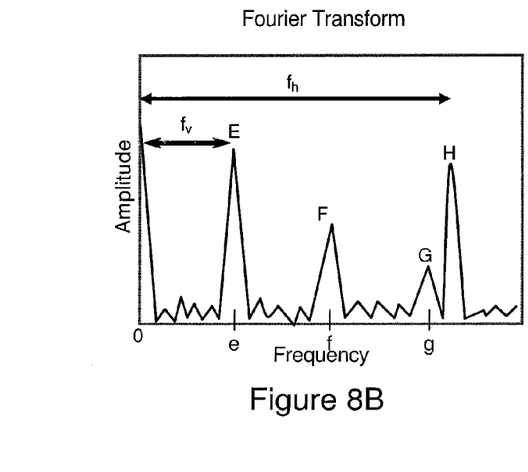

In another embodiment, a Fourier Transform, such as the Fast Fourier Transform or any other suitable implementation, can be applied to the auto-correlated signal to improve the extraction of timing parameters $f_v$ and/or $f_h$. Referring to FIG. 8B, the Fourier Transform of the auto-correlated signal of FIG. 8A is provided. As the auto-correlated signal will have peaks when the lag is an integer multiple of the frame length (e.g. $1/f_v$), the Fourier Transform will include a primary peak E at frequency e, which represents the vertical refresh rate $f_v$. The higher order harmonics at peaks F and G occur at approximately integer multiples of $f_v$.

As mentioned previously, the periodicity of the horizontal lines may be captured by secondary peaks in the auto-correlated signal. For example, the horizontal line periodicity may be reflected in the Fourier Transform at a peak H of much higher frequency than $f_v$ and with significant amplitude greater than peaks F and G of the higher order harmonics of $f_v$. For example, a computer monitor having a vertical refresh rate $f_v$ may be on the order of less than 100 Hz whereas the horizontal refresh rate $f_h$ is on the order of kHz. Therefore, the peak corresponding to $f_h$ may be significantly greater in amplitude than the peaks of the higher order harmonics of $f_v$ that may be nearby. The periodic information $f_v$ and/or $f_h$ can be determined from the Fourier Transform of the auto-correlated signal and sent to the decoding module 316 of FPGA 14. Applying the Fourier Transform can help to improve the determination of the timing parameters when the demodulated signal 314 has a low signal-to-noise ratio.

Figure 8C:
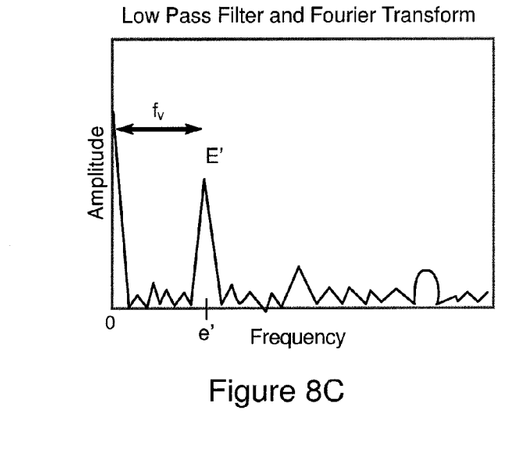

In another embodiment, a filter can be applied to the auto-correlated signal prior to applying the Fourier Transform. Windowing or filtering the auto-correlated signal may improve recovery of specific timing parameters while suppressing noise sources and spurious peaks. In the example of FIG. 8C, a low pass filter is applied to the auto correlated signal to attenuate the higher order harmonics in the auto-correlated signal. As a result, higher order harmonics at peaks F and G, along with peak H shown in FIG. 8B are significantly attenuated or absent from the Fourier Transform. Therefore, use of a low pass filter may simplify the determination of timing information by reducing the number of peaks to differentiate and identify. It can be appreciated that a high pass filter can be applied instead of a low pass filter to isolate a different peak in the auto-correlated signal, for example to identify $f_h$ from the Fourier Transform.

As mentioned above, the use of a filter may be used to isolate one frequency in the auto-correlated signal. If the demodulated signal 314 includes multiple sources with similar but unique timing parameters, a filter may help isolate one frequency per source in the auto-correlated signal and thus enable the SDR device 10 to determine when multiple sources are present in the demodulated signal 314, as indicated by the number of distinct peaks in the resulting Fourier Transform waveform. The frequency at each peak can then be determined and subsequently used as the respective vertical refresh rate $f_v$ when decoding multiple signals that are superimposed in the demodulated signal 314.

In another embodiment, the correlation module 322 can evaluate an accuracy or confidence parameter of the periodic information generated. As mentioned above, the Fourier Transform of the auto-correlated signal in FIG. 8B will include higher order harmonics at frequencies f and g of frequency e. By definition, the higher order harmonics should occur at integer multiples of e and thus, peaks E, F and G should be equal distance apart. In one example, the correlation module 322 can compute frequency e and the difference between its higher order harmonics (e.g. f-e, g-h). The mean of the computed values (i.e. e, f-e, and g-h) can be used as $f_v$ and the confidence parameter can be computed as the standard deviation of these values.

In another example, a width of the peak from which periodic information is obtained may be computed and used as a confidence parameter. In the example of FIG. 8C, frequency e' at peak E' represents the vertical refresh rate $f_v$. The width of the peak E' can be defined as the distance from the centre (i.e. frequency e') to a frequency in which the amplitude of the signal decays to a specified fraction (e.g. 1/sqrt(2)) of the maximum amplitude of peak E'. If the confidence parameter is below an acceptable value, correlation may be repeated until the confidence requirement is satisfied.

Referring back to FIG. 7, at block 712, the decoding module 316 obtains geometric information from the geometric module 330. In one example, the geometric module provides a value of $x_t$ and $y_t$ chosen from a predetermined set of values. The predetermined set of values may for example be limited to display resolutions belonging to computer display standards set by industry organizations such as VESA.

At block 714, the FPGA 14 decodes the demodulated signal 314 using the periodic information and geometric information to generate a decoded signal. As part of decoding the demodulated signal 314, the SDR device 10 may determine the location of the start of each frame of $x_t$ by $y_t$ pixels within the demodulated signal 314 so that the decoded signal 318 correctly identifies parts of the demodulated signal 314 that represent image pixels and horizontal and vertical retrace pauses. This alignment enables the images represented by the decoded signal 318 to be centred on a computer monitor that displays the decoded signal 318.

In an embodiment, the decoding module 316 can cross-correlate the demodulated signal 314 against a reference signal with known synchronization information (i.e. locations of the horizontal and vertical retrace pauses) that represent a similar image. The cross-correlated signal may provide a strong peak at the relative offset between the demodulated signal 314 and the reference signal. Compensating for this offset in the demodulated signal 314 enables the synchronization information of the reference signal to be applied to the demodulate signal 314. In one example, the reference signal may be agreed upon by the target monitor 20 and the SDR device 10. In another example, the reference signal may include a known image likely to be displayed on the target monitor such as a menu or start button of a popular operating system. It can be appreciated that multiple reference signals, each representing a different image that is typically displayed on a computer monitor, may be cross-correlated with the demodulated signal 314 and the synchronization information of the reference signal with the greatest correlation may be applied. In the case of multiple sources present in the demodulated signal 314, cross-correlating the demodulated signal 314 against a reference signal of a known image may aid in the timing reconstruction and improving the rejection of unwanted signal parameters.

In another embodiment, the decoding module 316 can identify properties in the demodulated signal 314 specific to horizontal and vertical retrace pauses. For example, the voltage values of the horizontal and vertical retrace pauses may be different and unique relative to the voltage values for the image pixels.

In another embodiment, alignment of the demodulated signal 314 can be performed manually be a user inspecting the resulting image represented by the demodulated signal 314 while adjusting the phase of the frame with respect to the demodulated signal 314.

At block 716, the decoded signal is evaluated to determine if the decoded signal 318 produces an intelligible image. If the decoded signal 318 produces an intelligible image, the tuning frequency used at block 702 is stored as the carrier frequency $f_c$ to be used at block 502 of FIG. 5, and the periodic information and geometric information is stored for use at block 514 of FIG. 5.

If the decoded message does not produce an intelligible image, FPGA 14 repeats blocks 712 (to obtain a different set of geometric information), 714 and 716 (indicated by dotted line 718) until either the decoded signal 318 produces an intelligible image or the geometric module 330 does not have any different geometric information to try. In the latter case, the tuning module 310 can then provide a different tuning frequency to the pre-processing utility 302 so that blocks 702 to 716 can be repeated (indicated by dotted line 720). The tuning frequency can be swept across a range of frequencies until the carrier frequency $f_c$, periodic information (e.g. $f_v$), and geometric information (e.g. $x_t$ and $y_t$) that produce an intelligible image is found.

In the example initialization process of FIG. 7, the SDR device 10 can perform blocks 702 to 716 across a range of tuning frequencies until the carrier frequency $f_c$ is obtained. The tuning module 310 of FPGA 14 can provide the frequency range to be swept. In one embodiment, the SDR device 10 can reduce the initialization process by generating a decoded signal 318 at a different tuning frequency before a prior decoded signal 318 has been evaluated. For example, blocks 702 to 708 can be performed on a set of tuning frequencies such that the demodulated signal at each tuning frequency will be generated and sent to the GPU 16 sequentially. Since auto-correlation performed at block 710 can take much longer in time than blocks 702 to 708 to generate a demodulated signal, multiple demodulated signals at different tuning frequencies can be auto-correlated by the GPU 16 in parallel. The parallel processing capabilities of GPU 16 are well suited to perform auto-correlation, which generally incorporates FFTs.

Once auto-correlation for a demodulated signal at a particular tuning frequency is completed, decoding can be performed on that demodulated signal. The decoded signals at different tuning frequencies and/or with different geometric information can also be evaluated simultaneously. For example, multiple images, each corresponding to the image of a decoded signal with a different tuning frequency and/or different geometric information can be provided to a user of the SDR device 10 for selection of the intelligible image. Alternatively, the selection of the intelligible image can be performed by the device 10 itself, through the implementation of image recognition and analysis software to identify a intelligible image based on predefined criteria.

It can be appreciated that the tuning frequency range and choices of geometric information in the example initialization process can be reduced based on the specifications of the target monitor 22. For example, if the geometric information of the target monitor 22 is known, blocks 712-716 (indicated by dotted line 718) do not need to be repeated. In another example, if the electronic device generating the emanation signal 22 is a computer monitor, the set of geometric information to be used at blocks 712 to 716 can be limited to the known likely display modes, such as set out by the VESA standard, for example.

Figure 9A:
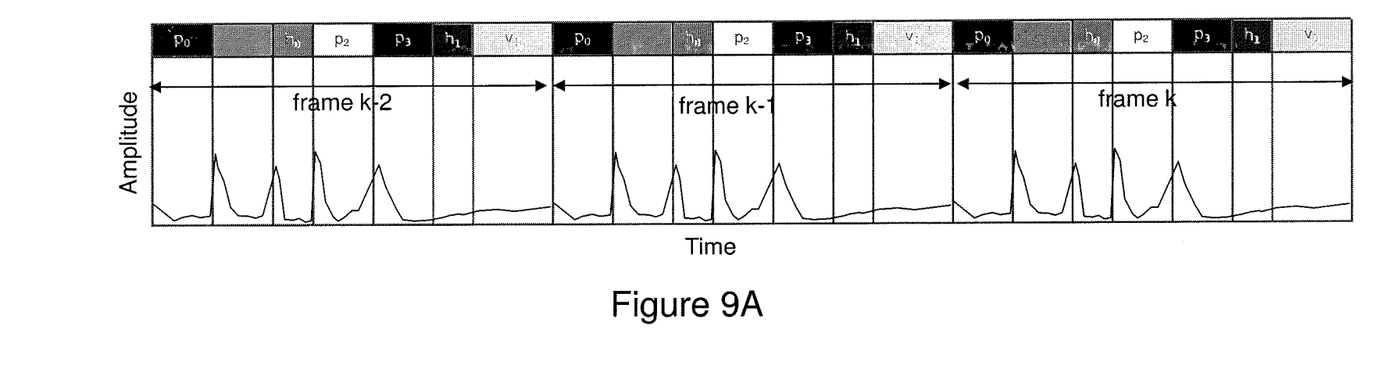
FIGS. 9A and 9B are waveforms corresponding to an example demodulated signal.
Figure 9B:
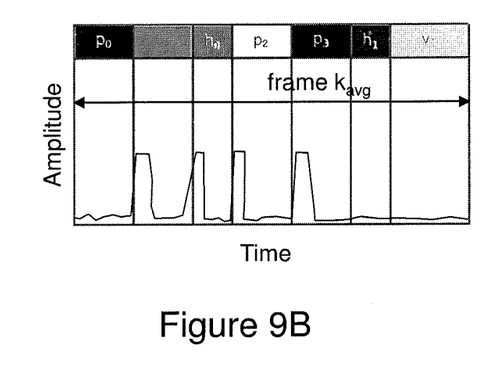

Turning back to FIG. 5, at block 508 the digital signal 306 is demodulated. In the example SDR device of FIG. 3, the decoding module 316 of FPGA 14 demodulates the digital signal 306. In one embodiment, the decoding module 316 can include a peak detector module to detect the peaks or envelope of the digital signal 306 using a suitable digital implementation to separate the carrier waveform from its underlying data. To improve demodulation, a segment of the demodulated signal (which includes at least one frame) can be averaged with one or more previous segments of the same length. Averaging can improve demodulation and result in a higher fidelity image that is subsequently generated from the decoded signal 318. FIG. 9A illustrates an example demodulated signal of 3 frame lengths after peak detection and FIG. 9B illustrates an example demodulated signal 314 of the digital signal 306 after averaging the current frame k with the two previous frames k-1, and k-2 to create an averaged frame $k_{avg}$ with less noise.

In another embodiment, averaging can occur after periodic information of the demodulated signal 314 has been obtained. In this embodiment, the demodulation module 312 can obtain the periodic information, such as the vertical refresh rate $f_v$ or frame length, from the process of block 502, as further described in FIG. 7, and incorporate this periodic information into averaging carried out by the demodulation module 312.

In another example, the demodulation module 312 can send the demodulated signal 314 to the correlation module 322 of the GPU 16 for generation of periodic information, which can be sent back to the demodulation module 312 for use in averaging. In this example, the correlation module 322 can continue to be in operation, even after the initialization process of FIG. 7.

As seen from FIGS. 5 and 7, the SDR device 10 can process the digital signal 306 first on the FPGA 14, and then pass the signal (with possibly reduced bandwidth) on to the GPU 16. This minimizes data transfers between the components of the device 10 which can be time consuming, bandwidth intensive, and require significant protocol overhead. Therefore, the use of FPGA 14 to process the digital signal 306 prior to use by GPU 16 can allow the SDR device 10 to process information in real-time, or near real-time.

In another embodiment, the example process of FIG. 5 can include additional operations to track and/or correct error in the decoded signal 318 generated at block 514 by modifying the decoded signal 318. For example, the decoded signal 18 can be fed into a error tracking module 320 implemented on the FPGA 14. The error tracking module 320 can implement a Kalman filter, such as a phase locked loop (PLL) to track the current frame of the decoded signal 318 in relation to one or more previous frames of the decoded signal 318. In the example of a PLL, the previous decoded signal could serve as the reference signal to reduce the amount of drift in subsequent frames of the decoded signal 18.

In another embodiment, the example process of FIG. 5 can include additional operations to track and/or correct error in the decoded signal 318 generated at block 514 by regenerating one or more parameters used in the process of FIG. 5. For example, the error tracking module 320 can measure one or more quality of service (QoS) parameters and if the QoS parameters reaches a predefined value, the error tracking module 320 can activate the correlation module of GPU 16 to regenerate periodic information (that may have changed over time), and to configure the decoding module 316 to use the updated periodic information. In this example, the QoS parameters can be used to dynamically tune algorithm parameters or processes carried out by the device 10 to minimize time consuming and expensive computations or signal flows as only when needed. The QoS parameter could be a measure of the quality or error in the decoded signal 318, be a interval of time or be any other suitable parameter. Furthermore, the calculation of the QoS parameters could be based on the current state of the device 10, or also incorporate the history of the device 10.

Turning back to FIG. 3, the SDR device 10 in this example can also include an CPU 18 configured to provide a user interface 324 for allowing a user to interact with the SDR device 10. The CPU 18 includes a GPU driver 326 and a FPGA driver 328. The drivers 326 and 328 enable the CPU 18 to communicate with the FPGA 14 and GPU 16 (for example, to program the FPGA 14 and GPU 16).

Figure 10:
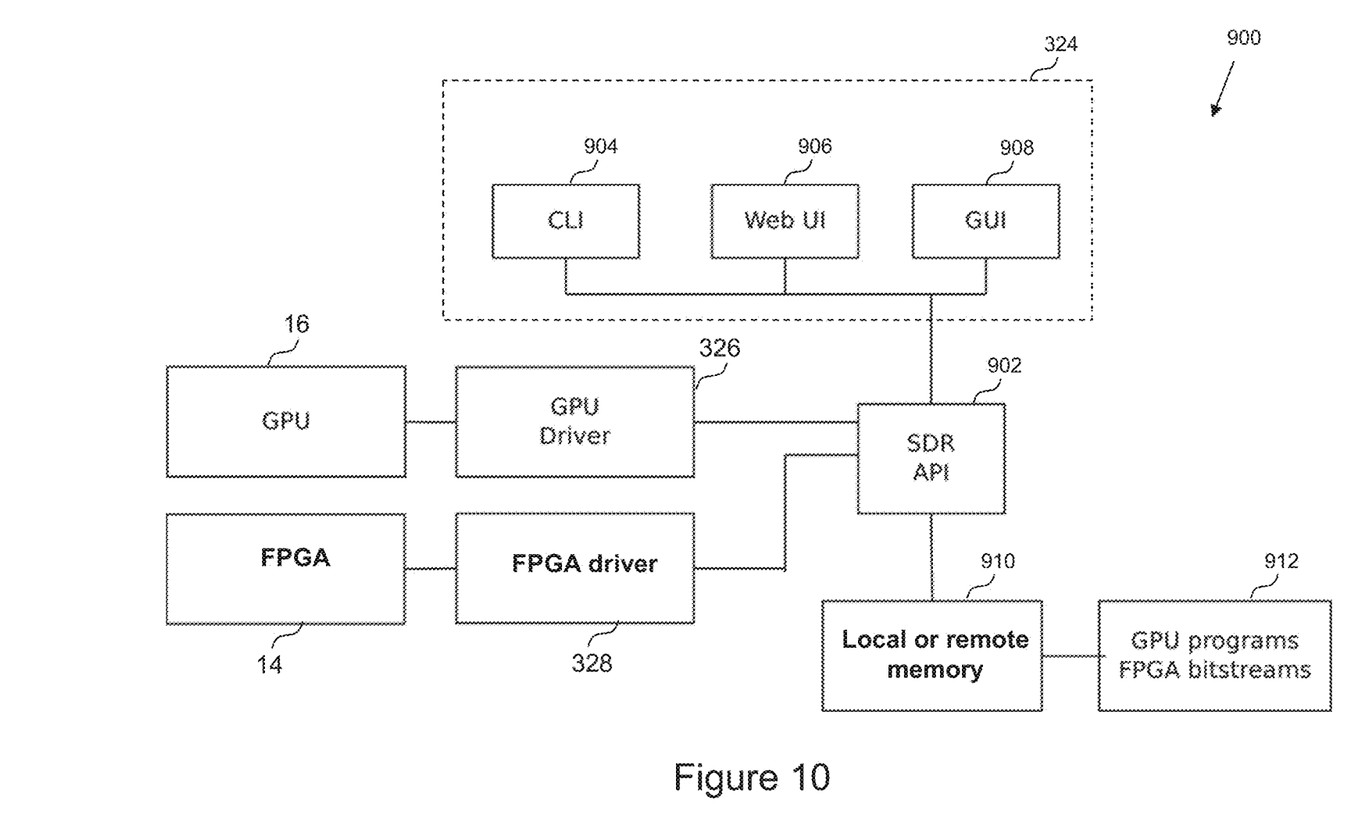
FIG. 10 is a block diagram of an example application layer of the SDR device.

Turning to FIG. 10, a block diagram of a example application layer 900 of the SDR device 10 is shown. In this example, the application layer 900 includes a SDR API 902 that provides the rules and specifications to access the components of the device 10, such as GPU 16 and FPGA 14. Each component also has its own driver to interface with the SDR API 902 (e.g. GPU driver 326, FPGA driver 328). Accordingly, a user can access the device 10 using the user interface 324, which can include a command line interface (CLI) 904, web user interface (Web UI) 906 and/or graphical user interface (GUI) 908, enabling communication with the device resources through the API 902. In the example of FIG. 10, the API 902 can provide access to a local or remote memory 910 (e.g. remote memory can be accessible through a network). The local or remote memory 910 can store GPU programs and FPGA bit streams 912 used to operate the SDR device 10.

The application layer 900 provides a common API to remote users connecting to the SDR device 10. The user can connect to the device for the purpose of receiving data from the SDR device 10, injecting data to be transmitted by SDR device 10, or for configuring the SDR device 10. It can be appreciated that the device 10 may be programmed to allow it to autonomously act to capture, transmit, store, or communicate with other devices. The application layer 900 also provides a means by which processed data may be sent over another, possibly lower bandwidth, connection to remote users. The application layer 900 can provide a mechanism by which remote users may access and retrieve stored data, as well as modify and program the behaviour of the device 10.

In one embodiment, the Web UI 906 is operable to allow communication between the SDR device 10 and a remote user over the internet. For example, connections to the SDR device 10 can be made through an internet communication protocol such as Transmission Control Protocol/Internet Protocol (TCP/IP). A user can remotely communicate with the SDR device 10 using a third party web browser or SDR specific computer software. In the example of a web browser, GPU programs and FPGA bit streams 912 can be transferred over the network using a networking protocol such as Hypertext Transfer Protocol (HTTP) POST commands. The Web UI 906 can receive GPU programs and send them to the GPU 16 via the SDR API 902 and GPU driver 326. The Web UI 906 can receive FPGA bitstreams and send them to the FPGA 14 via the SDR API 902 and the FPGA driver 328. The Web UI 906 can also be operable to allow a user to configure and control the behaviour of the SDR device 10 through HTTP GET commands, for example. The Web UI 906 can translate the HTTP GET commands to API calls for the SDR API 902.

It can be appreciated that software running on the SDR device 10 is not constrained to one physical component. It may run on the CPU 18, GPU 16, FPGA 14 and/or RF front end 12. Each physical component can perform a different computational task. For example, CPU 18 or FPGA 14 can provide a user interface, retrieve and store data from memory, and dynamically program and configure GPU 16 and RF front end 12. The GPU 16 can run computationally intensive tasks such as spectrum analysis and cryptanalysis. The RF front end 12 can provide the analog means necessary for a desired application.

Although the SDR device 10 has been described for intercepting an emanation signal 22, it can be appreciated that the SDR device 10 can also transmit a signal with similar properties as the emanation signal 22. For example, the SDR device 10 could be modified for transmitting a signal with similar properties as the emanation signal 22 by providing a transmitter similar to the previously described receiver by replacing the demodulation module 312 with a corresponding modulation module, replacing decoding module 316 with a corresponding encoding module, and replacing ADC 304 and pre-processing utility 302 with a corresponding digital to analog converter (DAC) and pre-processing utility downstream from the DAC. Once the synchronization information and carrier frequency of the emanation signal 22 is known (for example, as determined during the process of reconstructing the input signal 24 from the emanation signal 22), the SDR device could simply reverse the process described above to encode a signal based on the synchronization information, modulate the encoded signal using the carrier frequency of the emanation signal, convert the modulated signal to an analog signal and then transmit the analog signal using the antenna 28. It can further be appreciated that the SDR device of 10 could be modified to both decode an emanation signal 22 and transmit a signal with similar properties to the emanation signal 22 by adding, instead of replacing, the appropriate components described above.

It can also be appreciated that the SDR device 10 can receive emanation signals from other electronic devices in addition to computer monitors. For example, electromagnetic radiation emanating from a keyboard can be analyzed to determine the data entered using the keyboard (i.e. identifying the sequence of keys pressed). The SDR device 10 allows its user to surreptitiously reconstruct data that can be used remotely, without the knowledge of originating device or user of that device.

It can also be appreciated that the SDR 10 can perform management activities. This can include using the signal or spectral information to manage the connection or communication itself. Management activity can also include monitoring the network or ambient RF environment to modify the communication protocols parameters to optimize transmission, reception and other communication characteristics. The SDR device 10 can choose to redefine its transmission parameters independently, based on predefined algorithms or in concert with other devices. These cognitive algorithms may be calculated on the FPGA 14 or parallelized and calculated on the GPU 16.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A method of decoding a radio signal by an electronic device comprising:
   receiving the radio signal;
   digitizing the radio signal;
   auto-correlating the digitized radio signal to generate a first signal;
   determining periodic information of the radio signal using the first signal, comprising:
      applying a filter to the first signal to generate a second signal;
      applying a Fourier Transform to the second signal to generate a third signal; and
      identifying one or more peaks in the third signal;
   generating a confidence parameter to evaluate the periodic information; and
   decoding the radio signal using the periodic information.

2. The method of claim 1 wherein determining periodic information of the radio signal using the first signal further comprises identifying one or more peaks in the first signal.

3. The method of claim 2 wherein the confidence parameter comprises statistical information of the one or more peaks in the first signal.

4. The method of claim 2 wherein the confidence parameter comprises a width of a peak identified in the first signal.

5. The method of claim 1 wherein the confidence parameter comprises statistical information of one or more peaks identified in the third signal.

6. The method of claim 1 wherein the confidence parameter comprises a width of a peak identified in the third signal.

7. The method of claim 1 wherein the radio signal comprises an emanation signal from a source electronic device.

8. The method of claim 7 wherein the source electronic device comprises a monitor.

9. The method of claim 8 wherein the periodic information comprises at least one of a vertical refresh rate and a horizontal refresh rate.

10. The method of claim 9 further comprising determining a location within the radio signal as the starting location of a frame.

11. The method of claim 10 wherein determining the location comprises:
   cross-correlating the radio signal with one or more reference signals;
   shifting the radio signal by an offset based on the cross-correlation; and
   applying synchronization information of one of the one or more reference signals to the radio signal.

12. The method of claim 10 wherein determining the location comprises identifying at least one of a vertical retrace pause and a horizontal retrace pause in the radio signal.

13. The method of claim 1, further comprising demodulating the radio signal prior to auto-correlation.

14. The method of claim 1 further comprising, when the confidence parameter is below an acceptable value, repeating the auto-correlating, the determining periodic information, and the generating the confidence parameter, until the confidence parameter meets the acceptable value.

15. An electronic device for decoding a radio signal, the electronic device comprising a radio frequency front end, a processing unit and memory, the memory storing computer executable instructions for:
   receiving the radio signal;
   digitizing the radio signal;
   auto-correlating the digitized radio signal to generate a first signal;
   determining periodic information of the radio signal using the first signal, comprising:
      applying a filter to the first signal to generate a second signal;
      applying a Fourier Transform to the second signal to generate a third signal; and
      identifying one or more peaks in the third signal;
   generating a confidence parameter to evaluate the periodic information; and
   decoding the radio signal using the periodic information.

16. The electronic device of claim 15, wherein the radio frequency front end receives and digitizes the radio signal, and wherein the processing unit comprises a field programmable gate array in communication with the radio frequency front end, the field programmable gate array for performing serial processing on the digitized radio signal provided by the radio frequency front end.

17. The electronic device of claim 16, wherein the processing unit further comprises a graphics processing unit in communication with the field programmable gate array for performing parallel processing on the digitized radio signal provided by the field programmable gate array.

18. The electronic device of claim 17 wherein at least one of the radio frequency front end, the field programmable gate array and the graphics processing unit is configured to receive data over a communication network.

19. The electronic device of claim 18 wherein the data includes configuration information for at least one of the radio frequency front end, the field programmable gate array and the graphics processing unit.

20. The electronic device of claim 15 wherein the memory further stores computer executable instructions for, when the confidence parameter is below an acceptable value, repeating the auto-correlating, the determining periodic information, and the generating the confidence parameter, until the confidence parameter meets the acceptable value.

21. A non-transitory computer readable storage medium for decoding a radio signal by an electronic device, the computer readable storage medium comprising computer executable instructions for:
  receiving the radio signal;
  digitizing the radio signal;
  auto-correlating the digitized radio signal to generate a first signal;
  determining periodic information of the radio signal using the first signal, comprising:
    applying a filter to the first signal to generate a second signal;
    applying a Fourier Transform to the second signal to generate a third signal; and
    identifying one or more peaks in the third signal;
  generating a confidence parameter to evaluate the periodic information; and
  decoding the radio signal using the periodic information.

22. The non-transitory computer readable storage medium of claim 21 further comprising computer executable instructions for, when the confidence parameter is below an acceptable value, repeating the auto-correlating, the determining periodic information, and the generating the confidence parameter, until the confidence parameter meets the acceptable value.

* * * * *